UNITED STATES PATENT OFFICE.

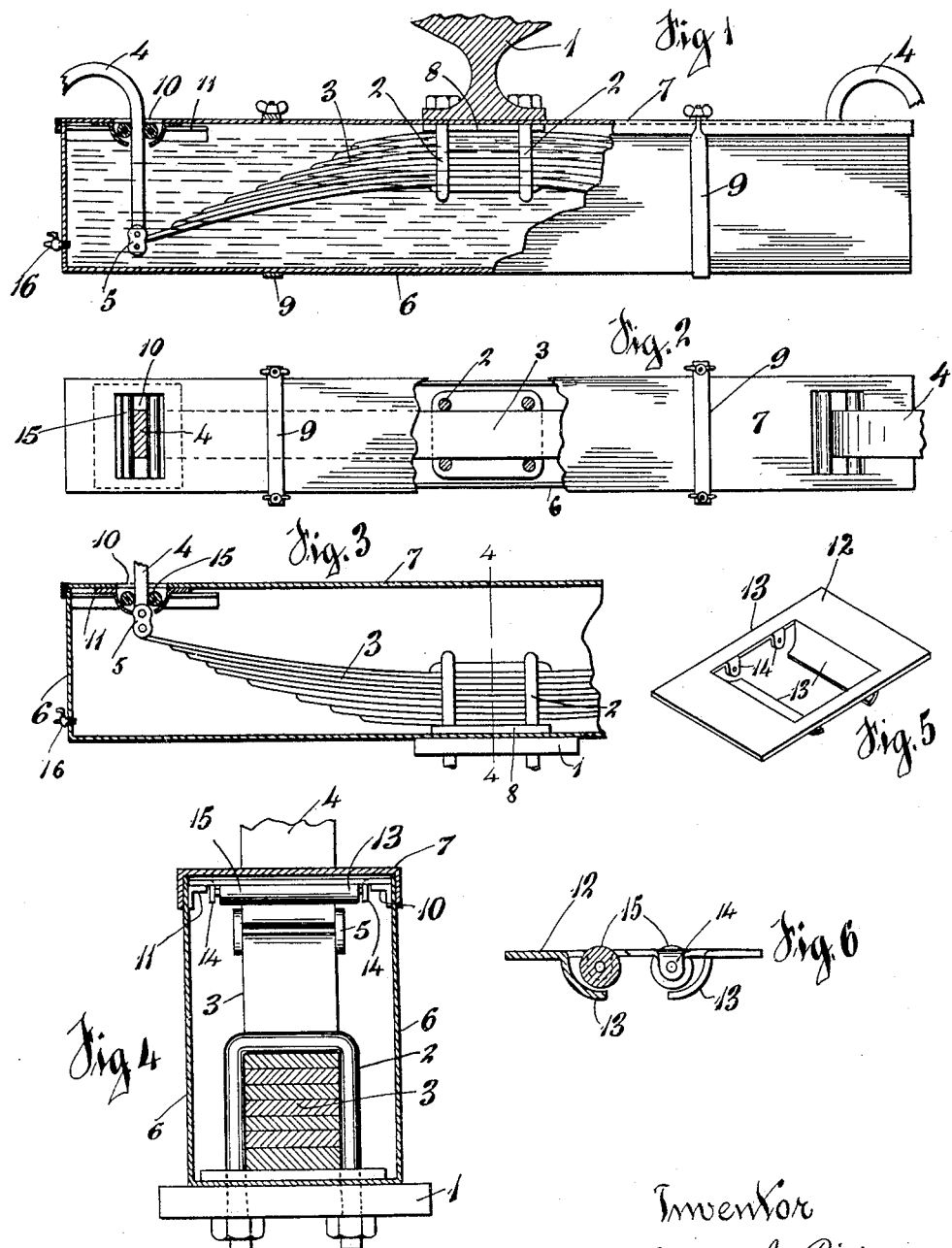

JAMES I. RICHEY, OF CINCINNATI, OHIO.

MEANS FOR LUBRICATING LEAF-SPRINGS.

1,399,152.   Specification of Letters Patent.   Patented Dec. 6, 1921.

Application filed November 18, 1920. Serial No. 424,833.

*To all whom it may concern:*

Be it known that I, JAMES I. RICHEY, a citizen of the United States, and resident of Cincinnati, in the county of Hamilton and State of Ohio, have invented certain new and useful Improvements in Means for Lubricating Leaf-Springs, of which the following is a full, clear, and exact description, reference being had to the accompanying drawings, forming a part of this specification.

My invention relates to means for lubricating leaf springs, and has reference particularly to the provision of suitable casing or housing for a leaf spring, in which a supply of lubricant for the spring may be contained.

The life and efficient performance of leaf springs, as used in automobiles and other vehicles, is dependent largely upon their satisfactory lubrication. Among the benefits obtained by such lubrication of the springs of a vehicle are ease and comfort in riding, lack of unpleasant noises and decreased wear to the mechanism of the car or other vehicle, including the tires thereof. The principal object of the present invention is to provide a rigid box-like casing or housing for a leaf spring, the same being arranged to contain a supply of lubricant within which the spring operates, the latter being virtually immersed within the lubricant and thus thoroughly lubricated at all times.

A further object of the invention is to provide a housing of the character mentioned of such capacity that sufficient lubricant may be carried for use in the lubrication of transmissions and other operating parts of the vehicle, the housing being provided with means for drawing off lubricant for the purpose.

Other objects of the invention will appear from the following detailed description thereof.

In the drawings:

Figure 1 is an elevation of a leaf spring provided with a housing in accordance with the present invention, part of the housing being broken away to illustrate features of construction:

Fig. 2 is a plan view of the invention as illustrated in Fig. 1.

Fig. 3 is a sectional view of the invention as applied to a leaf spring mounted in inverted position.

Fig. 4 is a section of line 4—4 of Fig. 3.

Fig. 5 is a perspective of one of the slidable shutters, the rollers being removed.

Fig. 6 is a longitudinal section of the shutter with the rollers.

The numeral 1 indicates a portion of the frame of a motor car or other vehicle. Secured to the frame member 1 by the usual U-bolts or clips 2, is a leaf spring 3 of ordinary construction, the ends of the spring being secured to the body hangers 4 by means of the usual spring shackles 5.

The numeral 6 indicates a rectangular box or casing constructed of metal or other suitable material, the same being adapted entirely to surround the spring 3, the ends extending beyond the hangers 4 and thus including the shackles 5 within the housing. A lid or cover 7 is provided for the casing 6, said cover being secured between the frame member 1 and a plate 8 above the spring 3, the clips 2 passing through perforations in the cover. The casing 6 is secured to the cover 7 by means of bands or clips 9.

The cover 7 is provided near its ends with openings 10 for the body hangers 4. The side walls of the casing 6, or the underside of the cover as preferred, along the sides of the openings 10 are provided with flanges 11, the same being located slightly below the cover 7. Arranged to rest upon the flanges 11 under each of the openings 10 is a shutter comprising a frame 12, having arced depending flanges 13 and bearing ears or lugs 14 within which rollers 15 are mounted, as clearly shown in Fig. 6. The rollers 15 are spaced apart and located above the respective flanges 13, the space between the rollers 15 being just sufficient to permit the passage of the hangers 4, the rollers bearing on opposite sides of the hangers, as shown in Figs. 1 and 3. The housing is provided with a drain-cock 16.

From the foregoing description the nature and operation of the present invention will be apparent to those skilled in the art to which the same appertains. When provided with a housing constructed in accordance with the foregoing description, it will be seen that the spring, as well as its shackles, is entirely inclosed within a rectangular box-like receptacle within which the same may be immersed in a suitable lubricant. During the operating flexions of the spring the hangers 4 move longitudinally relative to the housing, and this movement is accommodated by means of the sliding shutters 13, the rollers 15 of which bear against the sides of the hangers and thus cause the shutters to move according to the relative positions of the hangers and housing. The rollers 15, in connection with the other portions of the shutters 12, form complete closures for the openings 10, and any lubricant deposited upon the rollers from the hangers is drained upon the flange 13 and thence back into the housing. As it is not entirely essential that the spring be entirely immersed in the lubricant, it is unnecessary that the housing be kept full at all times, and thus when required a portion of the lubricant may be withdrawn through the drain-cock 16.

Having thus fully described my invention, what I claim as new and desire to secure by Letters Patent is:—

1. A housing of the character specified comprising in combination with the frame of a vehicle, a leaf spring and clips for securing said spring to said frame, a casing arranged to surround the spring, a cover for said casing, said housing being secured by said clips between the spring and frame, and means for securing said cover and casing together.

2. A housing of the character specified comprising in combination with the frame of a vehicle, a leaf spring and clips for securing said spring to said frame, a casing arranged to surround the spring, a cover for said casing, said housing being secured by said clips between the spring and frame, means for securing said cover and casing together and a drain-cock on said casing.

3. A housing of the character specified comprising a casing, a cover for said casing, said cover having hanger openings near its ends, and a slidable shutter for each of said openings, said shutters being provided with openings arranged to bear movably against the sides of the hangers.

4. A housing of the character specified comprising a casing, a cover for said casing, said cover having hanger openings near its ends, a slidable shutter for each of said openings, and a pair of rollers mounted on each of said shutters, the rollers of each pair being spaced apart so as to provide passage for, and to bear against the sides of, the hangers.

5. A housing of the character specified comprising a casing, a cover for said casing, said cover having hanger openings near its ends, a slidable shutter for each of said openings, a pair of rollers mounted on each of said shutters, the rollers of each pair being spaced apart so as to provide passage for, and to bear against the sides of, the hangers and arced flanges on said shutters extending under said rollers.

JAMES L. RICHEY.